United States Patent
Takemura et al.

(10) Patent No.: US 9,663,618 B2
(45) Date of Patent: May 30, 2017

(54) OPTICAL MATERIAL COMPOSITION, AND APPLICATION FOR SAME

(71) Applicant: MITSUBISHI GAS CHEMICAL COMPANY, INC., Tokyo (JP)

(72) Inventors: Kouhei Takemura, Osaka (JP); Takashi Aoki, Osaka (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 15/112,507

(22) PCT Filed: Mar. 1, 2016

(86) PCT No.: PCT/JP2016/056153
§ 371 (c)(1),
(2) Date: Jul. 19, 2016

(87) PCT Pub. No.: WO2016/111385
PCT Pub. Date: Jul. 14, 2016

(65) Prior Publication Data
US 2016/0355641 A1    Dec. 8, 2016

(30) Foreign Application Priority Data
Mar. 31, 2015 (JP) .................. 2015-072690

(51) Int. Cl.
| | | |
|---|---|---|
| C08G 18/75 | (2006.01) | |
| C08G 75/08 | (2006.01) | |
| C08G 18/38 | (2006.01) | |
| G02B 1/04 | (2006.01) | |
| C08L 81/00 | (2006.01) | |
| C08L 81/02 | (2006.01) | |

(52) U.S. Cl.
CPC ............ *C08G 75/08* (2013.01); *C08G 18/38* (2013.01); *C08L 81/00* (2013.01); *C08L 81/02* (2013.01); *G02B 1/04* (2013.01); *G02B 1/041* (2013.01)

(58) Field of Classification Search
CPC combination set(s) only.
See application file for complete search history.

(56) References Cited

U.S. PATENT DOCUMENTS

| | | | |
|---|---|---|---|
| 6,117,923 | A | 9/2000 | Amagai et al. |
| 6,472,495 | B1 | 10/2002 | Yoshimura et al. |
| 9,447,226 | B2 * | 9/2016 | Okada ............... C08G 18/3855 |
| 2004/0122201 | A1 | 6/2004 | Yoshimura et al. |
| 2004/0254258 | A1 | 12/2004 | Horikoshi et al. |
| 2015/0166720 | A1 | 6/2015 | Okada et al. |

FOREIGN PATENT DOCUMENTS

| | | |
|---|---|---|
| EP | 1 270 566 | 1/2003 |
| EP | 2 894 177 | 7/2015 |
| JP | 9-110979 | 4/1997 |
| JP | 10-298287 | 11/1998 |
| JP | 2001-2783 | 1/2001 |
| JP | 2001-131257 | 5/2001 |
| JP | 2002-122701 | 4/2002 |
| JP | 2006-348289 | 12/2006 |
| JP | 2010-72212 | 4/2010 |
| JP | 2010-285608 | 12/2010 |
| WO | 2014/038654 | 3/2014 |

OTHER PUBLICATIONS

International Search Report issued in PCT International Application No. PCT/JP2016/056153, dated Apr. 5, 2016.
Written Opinion issued in PCT International Application No. PCT/JP2016/056153, dated Apr. 5, 2016 with English translation thereof.
Extended European Search Report issued in Patent Application No. 16735123.8, dated Nov. 18, 2016.

* cited by examiner

*Primary Examiner* — Monique Peets
(74) *Attorney, Agent, or Firm* — Greenblum & Bernstein, P.L.C.

(57) ABSTRACT

Provided is an optical material composition, with which an optical material is obtained having excellent quality such as excellent color tone and lightfastness, a low level of striae, and high transparency when polymerization-cured. Through use of the optical material composition, which includes a compound represented by formula (1) and an episulfide compound represented by formula (2), the ratio of the compound represented by formula (1) to the combined total amount of the compound represented by formula (1) and the episulfide compound represented by formula (2) being 0.001-5.0% by mass, it is possible to provide an optical material composition for manufacturing an optical material having a high refractive index, the optical material having excellent quality such as transparency, striae, color tone, and lightfastness. (In the formula, m represents an integer of 0-4, and n represents an integer of 0-2.)

(1)

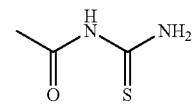

(2)

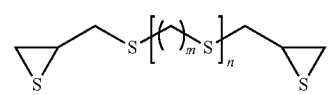

11 Claims, No Drawings

OPTICAL MATERIAL COMPOSITION, AND APPLICATION FOR SAME

TECHNICAL FIELD

The present invention relates to a composition for optical material, which comprises an episulfide compound. More specifically, the present invention relates to such a composition for optical material, which is preferred for use in optical materials including plastic lenses, prisms, optical fibers, information recording substrates, filters and others, particularly plastic lenses.

BACKGROUND ART

Plastic lenses are light in weight and excellent in toughness, and are easy to dye. Performance particularly required for plastic lenses includes low specific gravity, high transparency and low yellowness index, high refractive index and high Abbe's number as optical performance, high heat resistance, high strength and so on. High refractive index allows a reduction in lens thickness, while high Abbe's number reduces chromatic aberration in lenses.

In recent years, there have been many reports of using organic compounds containing a sulfur atom(s) in an attempt to achieve high refractive index and high Abbe's number. Among them, a polyepisulfide compound containing sulfur atoms is known to achieve a good balance between refractive index and Abbe's number (Patent Document 1). Moreover, such a polyepisulfide compound is reactive with various compounds and therefore compositions thereof containing various compounds for the purpose of improving physical properties (Patent Documents 2 to 5).

PRIOR ART DOCUMENTs

Patent Documents

Patent Document 1: JP H09-110979 A
Patent Document 2: JP H 10-298287 A
Patent Document 3: JP 2001-002783 A
Patent Document 4: JP 2001-131257 A
Patent Document 5: JP 2002-122701 A

SUMMARY OF THE INVENTION

Problem to be Solved by the Invention

However, these compositions comprising an episulfide compound will reduce their optical properties (e.g., transparency, striation, color tone, light resistance) upon polymerization-curing; and hence improvements in these properties have been demanded. In particular, there has been a demand for techniques which allow these improvements in a simple manner, for example by addition of a readily available additive(s).

Namely, the problem of the present invention is to provide a composition for optical material, which results in an optical material of good quality (e.g., high transparency, a low level of striation, good color tone, good light resistance) in a simple manner when polymerized and cured.

Means to Solve the Problem

As a result of extensive and intensive efforts made to improve these optical properties, the inventors of the present invention have solved this problem by a composition for optical material, which comprises a specific compound and an episulfide compound, and consequently have reached the present invention. Namely, the present invention is as follows.

<1> A composition for optical material, which comprises a compound represented by the following formula (1) and an episulfide compound represented by the following formula (2), wherein the content of the compound represented by formula (1) is 0.001% to 5.0% by mass relative to the total mass of the compound represented by formula (1) and the episulfide compound represented by formula (2):

[Formula 1]

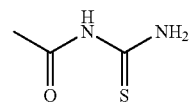

(1)

(2)

(wherein m represents an integer of 0 to 4, and n represents an integer of 0 to 2).

<2> The composition for optical material according to <1> above, which comprises the compound represented by formula (2) in an amount of 40% to 99.999% by mass.

<3> The composition for optical material according to <2> above, which further comprises a polythiol.

<4> The composition for optical material according to <3> above, which further comprises a polyisocyanate.

<5> The composition for optical material according to any one of <1> to <4> above, which further comprises sulfur.

<6> A polymerization-curable composition, which comprises the composition for optical material according to any one of <1> to <5> above and a polymerization catalyst in an amount of 0.0001% by mass to 10% by mass relative to the total mass of the composition for optical material.

<7> An optical material obtainable by curing the composition for optical material according to any one of <1> to <5> above or the polymerization-curable composition according to <6> above.

<8> An optical lens comprising the optical material according to <7> above.

<9> A method for producing an optical material, which comprises polymerization-curing the composition for optical material according to any one of <1> to <5> above by addition of a polymerization catalyst in an amount of 0.0001% to 10% by mass relative to the total mass of the composition for optical material.

<10> The method for producing an optical material according to <9> above, wherein the polymerizable compound represented by formula (2) and sulfur are partially subjected to polymerization reaction, followed by polymerization-curing.

Effects of the Invention

In the production of an optical material with high refractive index, the present invention can provide in a simple manner a composition for optical material, which results in an optical material excellent in quality (e.g., high transparency, a low level of striation, good color tone, good light resistance).

DESCRIPTION OF EMBODIMENTS

The present invention will be described in more detail below. The scope of the present invention is not limited by the following description, and any embodiments other than those illustrated below may also be carried out with appropriate modifications without departing from the spirit of the invention. It should be noted that all documents and publications cited herein are incorporated herein by reference in their entirety, regardless of their purposes. Moreover, this specification incorporates the contents disclosed in the claims, specification and drawings of Japanese Patent Application No. 2015-072690 (filed on Mar. 31, 2015), based on which the present application claims priority.

The present invention is directed to a composition for optical material, which comprises a compound represented by the following formula (1) and a compound represented by the following formula (2), and also directed to such a composition for optical material, which further comprises a compound polymerizable with the above compound represented by formula (2):

[Formula 2]

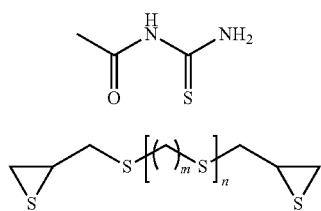

(1)

(2)

(wherein m represents an integer of 0 to 4, and n represents an integer of 0 to 2).

The content of the above compound represented by formula (1) in the composition for optical material of the present invention is 0.001% to 5.0% by mass, more preferably 0.005% to 3.0% by mass, particularly preferably 0.01% to 1.0% by mass, relative to the total mass of the compound represented by formula (1) and the above episulfide compound represented by formula (2). If the content of the compound represented by formula (1) is less than 0.001% by mass, striation might occur upon polymerization-curing and/or mold releasability might be decreased in some cases. If the content of the compound represented by formula (1) exceeds 5.0% by mass, sufficient optical properties cannot be obtained in some cases.

The content of the above compound represented by formula (2) in the composition for optical material of the present invention is preferably 40% to 99.999% by mass, more preferably 50% to 99.995% by mass, and particularly preferably 60% to 99.99% by mass. If the content is less than 40% by mass, it is not possible to take full advantage of the excellent optical properties of the episulfide compound.

A detailed explanation will be given below of the above compound represented by formula (1) and the above episulfide compound represented by formula (2).

The above compound represented by formula (1) is a known substance and can be purchased conveniently from various reagent manufacturers.

In the composition for optical material of the present invention, at least one of the above episulfide compound represented by formula (2) are used as polymerizable compounds. Specific examples of the episulfide compound of formula (2) include episulfides such as bis(β-epithiopropyl) sulfide, bis(β-epithiopropyl) disulfide, bis(β-epithiopropylthio)methane, 1,2-bis(β-epithiopropylthio)ethane, 1,3-bis(β-epithiopropylthio)propane, 1,4-bis(β-epithiopropylthio)butane and so on. These episulfide compounds having formula (2) may be used either alone or as a mixture of two or more of them.

Among them, preferred compounds include bis(β-epithiopropyl) sulfide (n=0 in formula (2)) and bis(β-epithiopropyl) disulfide (m=0 and n=1 in formula (2)), and the most preferred compound is bis(β-epithiopropyl) sulfide (n=0 in formula (2)).

As described above, the composition for optical material of the present invention may further comprise a compound polymerizable with the above compound represented by formula (2). Examples of such a polymerizable compound include any episulfide compound other than the above compound represented by formula (2), a polythiol compound, a vinyl compound, a methacrylic compound, an acrylic compound and an allyl compound. A preferred polymerizable compound is a polythiol compound, and it is more preferred that the composition for optical material further comprises a polyisocyanate compound reactive with a polythiol compound, and sulfur.

The composition for optical material of the present invention may comprise a polythiol compound as a polymerizable compound for the purpose of improving the color tone of the resulting resin upon heating. Such a polythiol compound is a compound containing two or more thiol groups in its molecule. The content of such a polythiol compound is generally 1% to 25% by mass, preferably 2% to 25% by mass, and particularly preferably 5% to 20% by mass, relative to the total mass of the composition for optical material, which is set to 100% by mass. If the content of the polythiol compound is 1% by mass or more, yellowing can be prevented from occurring during lens molding. If the content of the polythiol compound is 25% by mass or less, a decrease in heat resistance can be prevented. For use in the present invention, polythiol compounds may be used either alone or as a mixture of two or more of them.

Specific examples include methanedithiol, methanetrithiol, 1,2-dimercaptoethane, 1,2-dimercaptopropane, 1,3-dimercaptopropane, 2,2-dimercaptopropane, 1,4-dimercaptobutane, 1,6-dimercaptohexane, bis(2-mercaptoethyl) ether, bis(2-mercaptoethyl) sulfide, 1,2-bis(2-mercaptoethyloxy)ethane, 1,2-bis(2-mercaptoethylthio)ethane, 2,3 -dimercapto-1-propanol, 1,3-dimercapto-2-propanol, 1,2,3-trimercaptopropane, 2-mercaptomethyl-1,3-dimercaptopropane, 2-mercaptomethyl-1,4-dimercaptobutane, 2-(2-mercaptoethylthio)-1,3-dimercaptopropane, 4-mercaptomethyl-1,8-dimercapto-3,6-dithiaoctane, 2,4-dimercaptomethyl-1,5-dimercapto-3-thiapentane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 1,1,1-tris(mercaptomethyl)propane, tetrakis(mercaptomethyl)methane, ethylene glycol bis(2-mercaptoacetate), ethylene glycol bis(3-mercaptopropionate), diethylene glycol bis(2-mercaptoacetate), diethylene glycol bis(3-mercaptopropionate), 1,4-butanediol bis(2-mercaptoacetate), 1,4-butanediol bis(3-mercaptopropionate), trimethylolpropane tristhioglycolate, trimethylolpropane trismercaptopropionate, pentaerythritol tetrakisthioglycolate, pentaerythritol tetrakismercaptopropionate, 1,2-dimercaptocyclohexane, 1,3-dimercaptocyclohexane, 1,4-dimercaptocyclohexane, 1,3-bis(mercaptomethyl)cyclohexane, 1,4-bis(mercaptomethyl)cyclohexane, 2,5-dimercaptomethyl-1,4-dithiane, 2,5-dimercaptomethyl-1,4-dithiane, 2,5-bis(2-mercaptoethylthiomethyl)-1,4-dithiane, 2,5-dimercaptomethyl-1-thiane, 2,5-dimercaptoethyl-1-thiane, 2,5-dimercaptomethylthiophene, 1,2-dimercaptobenzene, 1,3 -dimercaptobenzene, 1,4-dimercaptobenzene, 1,3-bis(mercaptomethyl)benzene, 1,4-bis(mercaptomethyl)benzene, 2,2'-dimercaptobiphenyl, 4,4'-dimercaptobiphenyl, bis(4-mercaptophenyl)methane, 2,2-bis(4-mercaptophenyl)propane, bis(4-mercaptophenyl) ether, bis(4-mercaptophenyl) sulfide, bis(4-mercaptophenyl)sulfone, bis(4-mercaptomethylphenyl)methane, 2,2-bis(4-mercaptomethylphenyl)propane, bis(4-mercaptomethylphenyl) ether, bis(4-mercaptomethylphenyl) sulfide, 2,5-dimercapto-1,3,4-thiadiazole, 3,4-thiophenedithiol, and 1,1,3, 3-tetrakis(mercaptomethylthio)propane.

Among them, preferred specific examples include bis(2-mercaptoethyl) sulfide, 2,5-dimercaptomethyl-1,4-dithiane, 1,3-bis(mercaptomethyl)benzene, 1,4-bis(mercaptomethyl)benzene, 4-mercaptomethyl-1,8-dimercapto-3,6-dithiaoctane, 4,8-dimercaptomethyl-1,11 -dimercapto-3,6,9-trithiaundecane, 4,7-dimercaptomethyl-1,11-dimercapto-3,6,9-trithiaundecane, 5,7-dimercaptomethyl-1,11-dimercapto-3, 6,9-trithiaundecane, 1,1,3,3-tetrakis(mercaptomethylthio) propane, pentaerythritol tetrakismercaptopropionate, pentaerythritol tetrakisthioglycolate, trimethylolpropane tristhioglycolate) and trimethylolpropane trismercaptopropionate, and more preferred are bis(2-mercaptoethyl) sulfide, 2,5-bis(2-mercaptomethyl)-1,4-dithiane, 4-mercaptomethyl-1,8-dimercapto-3,6-dithiaoctane, 1,3-bis (mercaptomethyl)benzene, pentaerythritol tetrakismercaptopropionate and pentaerythritol tetrakisthioglycolate. Particularly preferred compounds are bis(2-mercaptoethyl) sulfide, 2,5-dimercaptomethyl-1,4-dithiane and 4-mercaptomethyl-1,8-dimercapto-3,6-dithiaoctane.

The composition for optical material of the present invention may comprise a polyisocyanate compound as a polymerizable compound for the purpose of improving the strength of the resulting resin. The polyisocyanate compound is a compound having two or more isocyanate groups in its molecule. In particular, the composition for optical material preferably comprises a polyisocyanate compound together with a polythiol compound. Isocyanate groups in the polyisocyanate compound and thiol groups in the polythiol compound easily cause a heat-curable reaction with each other to give a higher molecular weight, whereby the mechanical strength of the resulting optical material can be improved. The content of such a polyisocyanate compound is generally 1% to 25% by mass, preferably 2% to 25% by mass, and particularly preferably 5% to 20% by mass, relative to the total mass of the composition for optical material, which is set to 100% by mass. If the content of the polyisocyanate compound is 1% by mass or more, the strength can be improved. If the content of the polyisocyanate compound is 25% by mass or less, a reduction in color tone can be prevented. For use in the present invention, polyisocyanate compounds may be used either alone or as a mixture of two or more of them.

Specific examples include diethylene diisocyanate, tetramethylene diisocyanate, hexamethylene diisocyanate, trimethylhexamethylene diisocyanate, cyclohexane diisocyanate, 1,3-bis(isocyanatomethyl)cyclohexane, 1,4-bis(isocyanatomethyl)cyclohexane, isophorone diisocyanate, 2,6-bis(isocyanatomethyl)decahydronaphthalene, lysine triisocyanate, tolylene diisocyanate, o-tolidine diisocyanate, diphenylmethane diisocyanate, diphenylether diisocyanate, 3-(2'-isocyanatocyclohexyl)propyl isocyanate, isopropylidene bis(cyclohexylisocyanate), 2,2'-bis(4-isocyanatophenyl)propane, triphenylmethane triisocyanate, bis(diisocyanatotolyl)phenylmethane, 4,4', 4"-triisocyanato-2,5-dimethoxyphenylamine, 3,3'-dimethoxybenzidine-4,4'-diisocyanate, 1,3-phenylene diisocyanate, 1,4-phenylene diisocyanate, 4,4'-diisocyanatobiphenyl, 4,4'-diisocyanato-3,3'-dimethylbiphenyl, dicyclohexylmethane-4,4'-diisocyanate, 1,1'-methylenebis(4-isocyanatobenzene), 1,1'-methylenebis(3-methyl-4-isocyanatobenzene), m-xylylene diisocyanate, p-xylylene diisocyanate, m-tetramethylxylylene diisocyanate, p-tetramethylxylylene diisocyanate, 1,3-bis(2-isocyanato-2-propyl)benzene, 2,6-bis(isocyanatomethyl)naphthalene, 1,5-naphthalene diisocyanate, bis (isocyanatomethyl)tetrahydrodicyclopentadiene, bis(isocyanatomethyl)dicyclopentadiene, bis(isocyanatomethyl) tetrahydrothiophene, bis(isocyanatomethyl)norbornene, bis (isocyanatomethyl)adamantane, thiodiethyl diisocyanate, thiodipropyl diisocyanate, thiodihexyl diisocyanate, bis[(4-isocyanatomethyl)phenyl] sulfide, 2,5-diisocyanato-1,4-dithiane, 2,5-diisocyanatomethyl-1,4-dithiane, 2,5-diisocyanatomethylthiophene, dithiodiethyl diisocyanate, and dithiodipropyl diisocyanate.

However, the polyisocyanate compounds intended for use in the present invention are not limited to these examples, and these polyisocyanate compounds may be used either alone or as a mixture of two or more of them.

Among them, preferred specific examples are diisocyanate compounds, and more preferred is at least one compound selected from isophorone diisocyanate, tolylene diisocyanate, diphenylmethane diisocyanate, hexamethylene diisocyanate, m-xylylene diisocyanate, p-xylylene diisocyanate, m-tetramethylxylylene diisocyanate, p-tetramethylxylylene diisocyanate, 1,3-bis(isocyanatomethyl)cyclohexane, 1,4-bis(isocyanatomethyl)cyclohexane, bis(isocyanatomethyl)norbornene and 2,5-diisocyanatomethyl-1,4-dithiane. Among them, preferred compounds include isophorone diisocyanate, tolylene diisocyanate, diphenylmethane diisocyanate, hexamethylene diisocyanate, 1,3-bis(isocyanatomethyl)cyclohexane and m-xylylene diisocyanate, and particularly preferred compounds include isophorone diisocyanate, m-xylylene diisocyanate and 1,3-bis(isocyanatomethyl)cyclohexane.

Further, the ratio of the total number of SH groups in the polythiol compound(s) relative to the total number of NCO groups in the polyisocyanate compound(s) contained in the composition for optical material, i.e., [the number of SH groups in the composition/the number of NCO groups in the composition] (SH groups/NCO groups) is preferably 1.0 to 2.5, more preferably 1.25 to 2.25, and even more preferably 1.5 to 2.0. If the above ratio is less than 1.0, yellow coloration might occur during lens molding in some cases. If the ratio is greater than 2.5, the heat resistance might be reduced in some cases.

The composition for optical material of the present invention may comprise sulfur as a polymerizable compound for the purpose of improving the refractive index of the resulting resin. The content of sulfur is generally 0.1% to 15% by mass, preferably 0.2% to 10% by mass, and particularly preferably 0.3% to 5% by mass, relative to the total mass of the composition for optical material, which is set to 100% by mass. If the content of sulfur is 0.1% by mass or more, sulfur can contribute to the improvement of the refractive index. If the content of sulfur is 15% by mass or less, the viscosity of a polymerizable composition can be controlled. Moreover, in the method for producing an optical material according to the present invention, the above compound represented by formula (2) and sulfur may be partially subjected to polymerization reaction in advance for the purpose of allowing sulfur to be mixed homogeneously.

Conditions for this preliminary polymerization reaction are preferably set to −10° C. to 120° C. for 0.1 to 240 hours, more preferably 0° C. to 100° C. for 0.1 to 120 hours, and particularly preferably 20° C. to 80° C. for 0.1 to 60 hours. For progress of the preliminary reaction, it is effective to use a catalyst, and preferred examples include 2-mercapto-1-methylimidazole, triphenylphosphine, 3,5-dimethylpyrazole, N-cyclohexyl-2-benzothiazolylsulfinamide, dipentamethylenethiuram tetrasulfide, tetrabutylthiuram disulfide, tetraethylthiuram disulfide, 1,2,3-triphenylguanidine, 1,3-diphenylguanidine, 1,1,3,3-tetramethyleneguanidine, aminoguanidineurea, trimethylthiourea, tetraethylthiourea, dimethylethylthiourea, zinc dibutyldithiocarbamate, zinc dibenzyldithiocarbamate, zinc diethyldithiocarbamate, zinc dimethyldithiocarbamate, pipecolium pipecolyldithiocarbamate and so on. Further, it is preferred that 10% or more of sulfur (assuming that the sulfur content before the reaction is set to 100%) has been consumed by this preliminary polymerization reaction, and it is more preferred that 20% or more of sulfur has been consumed. The preliminary reaction may be effected under any atmosphere, e.g., in the presence of air or an inert gas (e.g., nitrogen), under sealed conditions at normal pressure or at elevated or reduced pressure. It should be noted that liquid chromatography or a refractometer may be used to detect the degree of progress of the preliminary reaction.

For use in the present invention, sulfur may be of any shape. More specifically, sulfur is micronized sulfur, colloid sulfur, precipitated sulfur, crystalline sulfur, sublimed sulfur or the like, but preferred is micronized sulfur composed of fine particles.

For use in the present invention, sulfur may be prepared in any manner. Techniques for sulfur preparation include purification from naturally occurring sulfur ore through sublimation, melt extraction of sulfur deposited underground, and recovery starting from hydrogen sulfide or the like generated during the desulfurization step of petroleum or natural gas, although any of these techniques may be used for this purpose.

For use in the present invention, sulfur preferably has a particle size of less than 10 mesh, i.e., sulfur is preferably in a micronized state smaller than 10 mesh. If sulfur has a particle size of greater than 10 mesh, sulfur is difficult to dissolve completely. For this reason, an unfavorable reaction or the like might occur in the first step, which leads to a trouble in some cases. The particle size of sulfur is preferably smaller than 30 mesh and most preferably smaller than 60 mesh.

For use in the present invention, sulfur has a purity of preferably 98% or higher, more preferably 99.0% or higher, even more preferably 99.5% or higher, most preferably 99.9% or higher. If the purity of sulfur is 98% or higher, the color tone of the resulting optical material will be greatly improved when compared to cases where the purity of sulfur is less than 98%.

When the composition for optical material of the present invention is polymerized and cured to obtain an optical material, it is preferable to add a polymerization catalyst. Namely, the composition of the present invention may be a polymerization-curable composition, which comprises the above composition for optical material and a polymerization catalyst. As a polymerization catalyst, an amine, a phosphine or an onium salt may be used, and particularly preferred is an onium salt, as exemplified by a quaternary ammonium salt, a quaternary phosphonium salt, a tertiary sulfonium salt and a secondary iodonium salt. Among them, more preferred are a quaternary ammonium salt and a quaternary phosphonium salt due to their good compatibility with the composition for optical material, and even more preferred is a quaternary phosphonium salt. More preferred polymerization catalysts include quaternary ammonium salts such as tetra-n-butyl ammonium bromide, triethyl benzyl ammonium chloride, cetyl dimethyl benzyl ammonium chloride, and 1-n-dodecyl pyridinium chloride, as well as quaternary phosphonium salts such as tetra-n-butyl phosphonium bromide, tetraphenyl phosphonium bromide and so on. Among them, even more preferred polymerization catalysts include tetra-n-butyl ammonium bromide, triethyl benzyl ammonium chloride and tetra-n-butyl phosphonium bromide.

The amount of the polymerization catalyst to be added will vary depending on the components of the composition, the mixing ratio thereof, and the process of polymerization-curing, and therefore cannot be determined uniformly. However, it is generally 0.0001% by mass to 10% by mass, preferably 0.001% by mass to 5% by mass, more preferably 0.01% by mass to 1% by mass, and most preferably 0.01% by mass to 0.5% by mass, relative to the total mass of the composition for optical material, which is set to 100% by mass. If an addition amount of the polymerization catalyst is greater than 10% by mass, polymerization might proceed rapidly in some cases. On the other hand, if the amount of the polymerization catalyst to be added is less than 0.0001% by mass, the composition for optical material might not be cured well, which results in poor heat resistance in some cases. Thus, in a preferred embodiment of the present invention, the method for producing an optical material comprises polymerization-curing the above composition for optical material by addition of a polymerization catalyst in an amount of 0.0001% to 10% by mass relative to the total mass of the composition for optical material.

In addition, during preparation of the optical material of the present invention, it is of course possible to further improve the practical utility of the resulting optical material by addition of additives such as a UV absorber, an antioxidant, a polymerization regulator, a bluing agent, a pigment and so on to the composition for optical material. Namely, the composition for optical material of the present invention may comprise additives such as a UV absorber, an antioxidant, a polymerization regulator, a bluing agent, a pigment and so on.

Preferred examples of a UV absorber include benzotriazole-based compounds, and particularly preferred compounds include 2-(2-hydroxy-5-methylphenyl)-2H-benzotriazole, 5-chloro-2-(3,5-di-tert-butyl-2-hydroxyphenyl)-2H-benzotriazole, 2-(2-hydroxy-4-octylphenyl)-2H-benzotriazole, 2-(2-hydroxy-4-methoxyphenyl)-2H-benzotriazole, 2-(2-hydroxy-4-ethoxyphenyl)-2H-benzotriazole, 2-(2-hydroxy-4-butoxyphenyl)-2H-benzotriazole, 2-(2-hydroxy-4-octyloxyphenyl)-2H-benzotriazole, and 2-(2-hydroxy-5-tert-octylphenyl)-2H-benzotriazole.

These UV absorbers are each added generally in an amount of 0.01% to 5% by mass relative to the total mass of the composition for optical material, which is set to 100% by mass.

During polymerization-curing of the composition for optical material, a polymerization regulator may optionally be added for the purpose of extending the pot life and/or dispersing the heat generated by polymerization, etc.

Examples of such a polymerization regulator include halides of Group 13 to 16 elements in the long-form periodic table. Among them, preferred are halides of silicon, germanium, tin and antimony, and more preferred are chlorides of germanium, tin and antimony, each having an alkyl group(s). Even more preferred compounds are dibutyltin dichloride, butyltin trichloride, dioctyltin dichloride, octyltin trichloride, dibutyldichlorogermanium, butyltrichlorogermanium, diphenyldichlorogermanium, phenyltrichlorogermanium and triphenylantimony dichloride, and the most preferred compound is dibutyltin dichloride. These polymerization regulators may be used either alone or as a mixture of two or more of them.

The amount of the polymerization regulator to be added is 0.0001% to 5.0% by mass, preferably 0.0005% to 3.0% by mass, and more preferably 0.001% to 2.0% by mass, relative to the total mass of the composition for optical material, which is set to 100% by mass. If the amount of the polymerization regulator to be added is 0.0001% by mass and more, it is possible to ensure sufficient pot life in the resulting optical material. If the amount of the polymerization regulator to be added is 5.0% by mass and less, the composition for optical material can be cured well, which prevents a reduction in the heat resistance of the resulting optical material.

The thus obtained composition for optical material or the thus obtained polymerization-curable composition may be casted into a mold or the like and polymerized therein to give an optical material. This results in an optical material cured from the composition for optical material of the present invention or from the polymerization-curable composition of the present invention.

At the time of casting the composition of the present invention, it is preferable to remove impurities by filtration through a filter having a pore size of about 0.1 to 5 µm, in terms of improving the quality of the optical material of the present invention.

Polymerization of the composition of the present invention may generally be effected as follows. Namely, the curing time is generally 1 to 100 hours, and the curing temperature is generally −10° C. to 140° C. Polymerization may be accomplished by holding at a given polymerization temperature for a given period of time, by increasing the temperature at a rate of 0.1° C. to 100° C./h, by decreasing the temperature at a rate of 0.1° C. to 100° C./h, or by any combination thereof. It should be noted that the curing time refers to the time required for polymerization-curing including the process of heating and cooling, i.e., the curing time includes not only the time required for holding at a given polymerization (curing) temperature, but also the time required for increasing the time to the given polymerization (curing) temperature or decreasing the temperature.

In addition, after completion of curing, the resulting optical material may be annealed at a temperature of 50° C. to 150° C. for about 10 minutes to 5 hours, which is preferred for removing distortions from the optical material of the present invention. Further, the resulting optical material may optionally be subjected to surface treatment such as staining, hard coating, impact resistance coating, antireflection, antifogging treatment, etc.

The optical material of the present invention can be preferably used for optical lenses. Optical lenses produced by using the composition of the present invention are very useful because they have good optical properties (e.g., high transparency, a low level of striation, good color tone, good light resistance) and therefore can be used in the fields of telescopes, binoculars, television projectors and others where expensive high refractive index glass lenses have been used conventionally. They are preferably used in the form of aspherical lenses, as needed. In the case of aspherical lenses, a single lens achieves substantially zero spherical aberration, which eliminates the need to remove spherical aberration by combining a plurality of spherical lenses, thereby achieving light weight and production cost savings. Thus, aspherical lenses are particularly useful as camera lenses among optical lenses.

EXAMPLES

The present invention will be described by way of the following examples and comparative examples, which are not intended to limit the scope of the present invention.
1. Procedure for Evaluation of Transparency In accordance with the procedures described in the following examples and comparative examples, 10 lenses of −4D were prepared for each sample and observed in a dark room under a fluorescent lamp. A sample showing no cloudiness in all the lenses was ranked as A, a sample showing no cloudiness in 7 to 9 lenses was ranked as B, and a sample showing no cloudiness in 6 lenses or less was ranked as C. Ranks A and B are acceptable levels.
2. Procedure for Evaluation of Striation In accordance with the procedures described in the following examples and comparative examples, 10 lenses of −15D were prepared for each sample and visually observed by the Schlieren method. A sample showing no striation in all the lenses was ranked as A, a sample showing no striation in 7 to 9 lenses was ranked as B, and a sample showing no striation in 6 lenses or less was ranked as C. Ranks A and B are acceptable levels.
3. Procedure for Evaluation of Initial Color Tone In accordance with the procedures described in the following examples and comparative examples, flat plates of 3.0 mm thickness were prepared and measured for their YI value using a colorimeter JS-555 (Color Techno System Corporation, Japan). A sample having a value of less than 1.0 was ranked as A, a sample having a value of 1.0 or more to less than 1.5 was ranked as B, and a sample having a value of 1.5 or more was ranked as C. Ranks A and B are acceptable levels.

It should be noted that the color tone indicated in Table 1 refers to the initial color tone evaluated by this procedure.
4. Procedure for Evaluation of Light Resistance
(1) Measurement of Initial Color Tone In accordance with the procedures described in the following examples and comparative examples, flat plates of 3.0 mm thickness were prepared and measured for their YI value using a colorimeter JS-555 (Color Techno System Corporation, Japan). This value is referred to as p.
(2) Measurement of Light-induced Change in Color Tone After measurement of the initial value, the flat plates were irradiated with carbon arc flame for 60 hours and then measured for their YI value. This value is referred to as q.

The value of (q-p)/p was calculated for each sample. A sample having a value of less than 1.0 was ranked as A, a sample having a value of 1.0 or more to less than 2.0 was ranked as B, and a sample having a value of 2.0 or more was ranked as B. Ranks A and B are acceptable levels.
5. Procedure for Evaluation of Mold Releasability In accordance with the procedures described in the following examples and comparative examples, lenses of −15D were prepared and evaluated for their releasability from the mold after being polymerized and cured. A sample easy to release from the mold was ranked as A, a sample slightly difficult to release from the mold was ranked as B, and a sample difficult to release from the mold was ranked as C. Ranks A and B are acceptable levels.

Examples 1 to 6 and Comparative Example 2

Bis(β-epithiopropyl) sulfide (hereinafter referred to as "Compound a") falling within the above episulfide compound represented by formula (2) and the above compound represented by formula (1) (hereinafter referred to as "Compound b") were mixed to prepare a composition whose content of Compound b was as indicated in Table 1. To 93 parts by mass of the resulting composition, 7 parts by mass of bis(2-mercaptoethyl) sulfide, 1.0 parts by mass of 2-(2-hydroxy-5-tert-octylphenyl)-2H-benzotriazole as a UV absorber and 0.05 parts by mass of tetra-n-butyl phosphonium bromide as a polymerization catalyst were added and then mixed well at 20° C. to give a homogeneous mixture. Subsequently, the mixture was degassed at a degree of vacuum of 1.3 kPa and poured into molds each being composed of two glass plates and a tape (which were designed to prepare flat plates of 3.0 mm thickness and lenses of −4D and −15D), and then polymerized and cured by heating at 30° C. for 10 hours, heating up to 100° C. at a constant temperature rise rate over 10 hours and finally heating at 100° C. for 1 hour. After cooling, the cured products were released from the molds and annealed at 110° C. for 60 minutes to obtain molded plates (i.e., flat plates of 3.0 mm thickness and lenses of −4D and −15D). The flat plates were evaluated for color tone and light resistance. The −4D lenses were evaluated for transparency and the −15D lenses were evaluated for striation and mold releasability. The evaluation results are shown in Table 1.

Comparative Example 1

The same procedure as shown in Example 1 was repeated to obtain molded plates (i.e., flat plates of 3.0 mm thickness and lenses of −4D and −15D), except that the composition prepared by mixing Compound a and Compound b was replaced with Compound a alone. The evaluation results are shown in Table 1.

Examples 7 to 12 and Comparative Example 4

Bis(β-epithiopropyl) disulfide (hereinafter referred to as "Compound c") falling within the above episulfide compound represented by formula (2) and Compound b were mixed to prepare a composition whose content of Compound b was as indicated in Table 1. To 93 parts by mass of the resulting composition, 7 parts by mass of bis(2-mercaptoethyl) sulfide, 1.0 parts by mass of 2-(2-hydroxy-5-tert-octylphenyl)-2H-benzotriazole as a UV absorber and 0.05 parts by mass of tetra-n-butyl phosphonium bromide as a polymerization catalyst were added and then mixed well at 20° C. to give a homogeneous mixture. Subsequently, the mixture was degassed at a degree of vacuum of 1.3 kPa and poured into molds each being composed of two glass plates and a tape (which were designed to prepare flat plates of 3.0 mm thickness and lenses of −4D and −15D), and then polymerized and cured by heating at 30° C. for 10 hours, heating up to 100° C. at a constant temperature rise rate over 10 hours and finally heating at 100° C. for 1 hour. After cooling, the cured products were released from the molds and annealed at 110° C. for 60 minutes to obtain molded plates (i.e., flat plates of 3 0 mm thickness and lenses of −4D and −15D). The evaluation results are shown in Table 1.

Comparative Example 3

The same procedure as shown in Example 7 was repeated to obtain molded plates (i.e., flat plates of 3.0 mm thickness and lenses of −4D and −5D), except that the composition prepared by mixing Compound c and Compound b was replaced with Compound c alone. The evaluation results are shown in Table 1.

TABLE 1

| Example | Major component | Added amount of Compound b (% by mass) | Color tone | Light resistance | Transparency | Striation | Mold releasability |
|---|---|---|---|---|---|---|---|
| Example 1 | Compound a | 0.001 | A | A | B | B | B |
| Example 2 | Compound a | 0.005 | A | A | B | B | A |
| Example 3 | Compound a | 0.01 | A | A | A | A | A |
| Example 4 | Compound a | 1.0 | A | A | A | A | A |
| Example 5 | Compound a | 3.0 | B | A | A | A | A |
| Example 6 | Compound a | 5.0 | B | B | A | A | A |
| Comparative Example 1 | Compound a | Absent | A | A | C | C | C |
| Comparative Example 2 | Compound a | 7.0 | C | C | A | A | A |
| Example 7 | Compound c | 0.001 | A | A | B | B | B |
| Example 8 | Compound c | 0.005 | A | A | B | B | B |
| Example 9 | Compound c | 0.01 | A | A | A | B | B |
| Example 10 | Compound c | 1.0 | B | A | A | B | A |
| Example 11 | Compound c | 3.0 | B | B | A | A | A |
| Example 12 | Compound c | 5.0 | B | B | A | A | A |
| Comparative Example 3 | Compound c | Absent | A | A | C | C | C |
| Comparative Example 4 | Compound c | 7.0 | C | C | A | A | A |

As can be verified from Table 1, when using a composition for optical material, which contains Compound a or c and Compound b and whose content of Compound b is 0.001% to 5.0% by mass relative to the total mass of Compound a or c and Compound b, good results are obtained for transparency, striation, color tone, light resistance and mold releasability. In contrast, in Comparative Examples 1 and 3 where a composition free from Compound b was used, transparency and mold releasability were not sufficient and striation occurred. Likewise, in Comparative Examples 2 and 4 where the content of Compound b was high, color tone and light resistance were not sufficient.

Examples 13 to 18 and Comparative Example 6

Compound a and Compound b were mixed to prepare a composition whose content of Compound b was as indicated in Table 2. To 60 parts by mass of the resulting composition, 20 parts by mass of bis(2-mercaptoethyl) sulfide as a thiol compound, 15 parts by mass of m-xylylene diisocyanate as an isocyanate compound, 5 parts by mass of sulfur (micronized sulfur of 98% or higher purity), 1.0 parts by mass of 2-(2-hydroxy-5-tert-octylphenyl)-2H-benzotriazole as a UV absorber and 0.05 parts by mass of tetra-n-butyl phosphonium bromide as a polymerization catalyst were added and then mixed well at 20° C. to give a homogeneous mixture. Subsequently, the mixture was degassed at a degree of vacuum of 1.3 kPa and poured into molds each being composed of two glass plates and a tape (which were designed to prepare flat plates of 3.0 mm thickness and lenses of −4D and −15D), and then polymerized and cured by heating at 30° C. for 10 hours, heating up to 100° C. at a constant temperature rise rate over 10 hours and finally heating at 100° C. for 1 hour. After cooling, the cured products were released from the molds and annealed at 110° C. for 60 minutes to obtain molded plates (i.e., flat plates of 3.0 mm thickness and lenses of −4D and −15D). The flat plates were evaluated for color tone and light resistance. The −4D lenses were evaluated for transparency and the −15D lenses were evaluated for striation and mold releasability. The evaluation results are shown in Table 2.

Comparative Example 5

The same procedure as shown in Example 13 was repeated to obtain molded plates (i.e., flat plates of 3 0 mm thickness and lenses of −4D and −15D), except that the composition prepared by mixing Compound a and Compound b was replaced with Compound a alone. The evaluation results are shown in Table 2.

Examples 19 to 24 and Comparative Example 8

Compound c and Compound b were mixed to prepare a composition whose content of Compound b was as indicated in Table 2. To 60 parts by mass of the resulting composition, 20 parts by mass of bis(2-mercaptoethyl) sulfide as a thiol compound, 15 parts by mass of m-xylylene diisocyanate as an isocyanate compound, 5 parts by mass of sulfur, 1.0 parts by mass of 2-(2-hydroxy-5-tert-octylphenyl)-2H-benzotriazole as a UV absorber and 0.05 parts by mass of tetra-n-butyl phosphonium bromide as a polymerization catalyst were added and then mixed well at 20° C. to give a homogeneous mixture. Subsequently, the mixture was degassed at a degree of vacuum of 1.3 kPa and poured into molds each being composed of two glass plates and a tape (which were designed to prepare flat plates of 3.0 mm thickness and lenses of −4D and −15D), and then polymerized and cured by heating at 30° C. for 10 hours, heating up to 100° C. at a constant temperature rise rate over 10 hours and finally heating at 100° C. for 1 hour. After cooling, the cured products were released from the molds and annealed at 110° C. for 60 minutes to obtain molded plates (i.e., flat plates of 3.0 mm thickness and lenses of −4D and −15D). The evaluation results are shown in Table 2.

Comparative Example 7

The same procedure as shown in Example 19 was repeated to obtain molded plates (i.e., flat plates of 3.0 mm thickness and lenses of −4D and −15D), except that the composition prepared by mixing Compound c and Compound b was replaced with Compound c alone. The evaluation results are shown in Table 2.

TABLE 2

| Example | Major component | Added amount of Compound b (% by mass) | Color tone | Light resistance | Transparency | Striation | Mold releasability |
| --- | --- | --- | --- | --- | --- | --- | --- |
| Example 13 | Compound a | 0.001 | A | A | B | B | A |
| Example 14 | Compound a | 0.005 | A | A | B | B | A |
| Example 15 | Compound a | 0.01 | A | A | A | A | A |
| Example 16 | Compound a | 1.0 | B | A | A | A | A |
| Example 17 | Compound a | 3.0 | B | A | A | A | A |
| Example 18 | Compound a | 5.0 | B | A | A | A | A |
| Comparative Example 5 | Compound a | Absent | A | A | C | C | C |
| Comparative Example 6 | Compound a | 7.0 | C | C | A | A | A |
| Example 19 | Compound c | 0.001 | A | A | B | B | B |
| Example 20 | Compound c | 0.005 | A | A | B | B | B |
| Example 21 | Compound c | 0.01 | A | A | B | B | A |
| Example 22 | Compound c | 1.0 | B | A | A | A | A |
| Example 23 | Compound c | 3.0 | B | B | A | A | A |
| Example 24 | Compound c | 5.0 | B | B | A | A | A |
| Comparative Example 7 | Compound c | Absent | A | A | C | C | C |
| Comparative Example 8 | Compound c | 7.0 | C | C | A | A | A |

As can be verified from Table 2, when using a composition for optical material, which contains Compound a or c and Compound b and whose content of Compound b is 0.001% to 5.0% by mass relative to the total mass of Compound a or c and Compound b, good results are obtained for transparency, striation, color tone, light resistance and mold releasability. In contrast, in Comparative Examples 5 and 7 where a composition free from Compound b was used, transparency and mold releasability were not sufficient and striation occurred. Likewise, in Comparative Examples 6 and 8 where the content of Compound b was high, color tone and light resistance were not sufficient.

Examples 25 to 30 and Comparative Example 10

Compound a and Compound b were mixed to prepare a composition whose content of Compound b was as indicated in Table 3. To 79 parts by mass of the resulting composition, 14 parts by mass of sulfur, 1.0 parts by mass of 2-(2-hydroxy-5-tert-octylphenyl)-2H-benzotriazole as a UV absorber and 0.5 parts by mass of mercaptomethylimidazole as a polymerization catalyst were added and then subjected to preliminary polymerization reaction at 60° C. Subsequently, after the reaction mixture was cooled to 20° C., a mixture containing 7 parts by mass of bis(2-mercaptoethyl) sulfide as a thiol compound, 0.2 parts by mass of dibutyltin dichloride as a polymerization regulator and 0.03 parts by mass of tetramethyl phosphonium bromide as a polymerization catalyst was added thereto and mixed homogeneously. The resulting homogeneous mixture was then degassed at a degree of vacuum of 1.3 kPa and poured into molds each being composed of two glass plates and a tape (which were designed to prepare flat plates of 3.0 mm thickness and lenses of −4D and −15D), and then polymerized and cured by heating at 30° C. for 10 hours, heating up to 100° C. at a constant temperature rise rate over 10 hours and finally heating at 100° C. for 1 hour. After cooling, the cured products were released from the molds and annealed at 110° C. for 60 minutes to obtain molded plates (i.e., flat plates of 3.0 mm thickness and lenses of −4D and −15D). The evaluation results are shown in Table 3.

Comparative Example 9

The same procedure as shown in Example 25 was repeated to obtain molded plates (i.e., flat plates of 3.0 mm thickness and lenses of −4D and −15D), except that the composition prepared by mixing Compound a and Compound b was replaced with Compound a alone. The evaluation results are shown in Table 3.

Examples 31 to 36 and Comparative Example 12

Compound c and Compound b were mixed to prepare a composition whose content of Compound b was as indicated in Table 3. To 79 parts by mass of the resulting composition, 14 parts by mass of sulfur, 1.0 parts by mass of 2-(2-hydroxy-5-tert-octyphenyl)-2H-benzotriazole as a UV absorber and 0.5 parts by mass of 2-mercapto-1-methylimidazole as a polymerization catalyst were added and then subjected to preliminary polymerization reaction at 60° C. Subsequently, after the reaction mixture was cooled to 20° C., a mixture containing 7 parts by mass of bis(2-mercaptoethyl) sulfide as a thiol compound, 0.2 parts by mass of dibutyltin dichloride as a polymerization regulator and 0.03 parts by mass of tetramethyl phosphonium bromide as a polymerization catalyst was added thereto and mixed homogeneously. The resulting homogeneous mixture was then degassed at a degree of vacuum of 1.3 kPa and poured into molds each being composed of two glass plates and a tape (which were designed to prepare flat plates of 3.0 mm thickness and lenses of −4D and −15D), and then polymerized and cured by heating at 30° C. for 10 hours, heating up to 100° C. at a constant temperature rise rate over 10 hours and finally heating at 100° C. for 1 hour. After cooling, the cured products were released from the molds and annealed at 110° C. for 60 minutes to obtain molded plates (i.e., flat plates of 3.0 mm thickness and lenses of −4D and −15D). The evaluation results are shown in Table 3.

Comparative Example 11

The same procedure as shown in Example 31 was repeated to obtain molded plates (i.e., flat plates of 3.0 mm thickness and lenses of −4D and −15D), except that the composition prepared by mixing Compound c and Compound b was replaced with Compound c alone. The evaluation results are shown in Table 3.

TABLE 3

| Example | Major component | Added amount of Compound b (% by mass) | Color tone | Light resistance | Transparency | Striation | Mold releasability |
|---|---|---|---|---|---|---|---|
| Example 25 | Compound a | 0.001 | A | A | B | B | B |
| Example 26 | Compound a | 0.005 | A | A | B | B | B |
| Example 27 | Compound a | 0.01 | A | A | A | B | A |
| Example 28 | Compound a | 1.0 | A | A | A | A | A |
| Example 29 | Compound a | 3.0 | B | A | A | A | A |
| Example 30 | Compound a | 5.0 | B | A | A | A | A |
| Comparative Example 9 | Compound a | Absent | A | A | C | B | C |
| Comparative Example 10 | Compound a | 7.0 | C | C | A | A | A |
| Example 31 | Compound c | 0.001 | A | A | B | A | B |
| Example 32 | Compound c | 0.005 | A | A | B | B | B |
| Example 33 | Compound c | 0.01 | A | A | B | B | A |
| Example 34 | Compound c | 1.0 | A | A | B | B | A |
| Example 35 | Compound c | 3.0 | B | A | B | A | A |
| Example 36 | Compound c | 5.0 | B | B | A | A | A |
| Comparative Example 11 | Compound c | Absent | A | A | C | B | C |
| Comparative Example 12 | Compound c | 7.0 | C | C | A | A | A |

As can be verified from Table 3, when using a composition for optical material, which contains Compound a or c and Compound b and whose content of Compound b is 0.001% to 5.0% by mass relative to the total mass of Compound a or c and Compound b, good results are obtained for transparency, striation, color tone, light resistance and mold releasability. In contrast, in Comparative Examples 9 and 11 where a composition free from Compound b was used, transparency and mold releasability were not sufficient. Likewise, in Comparative Examples 10 and 12 where the content of Compound b was high, color tone and light resistance were not sufficient.

The invention claimed is:

1. A composition for optical material, which comprises a compound represented by the following formula (1) and an episulfide compound represented by the following formula (2), wherein the content of the compound represented by formula (1) is 0.001% to 5.0% by mass relative to the total mass of the compound represented by formula (1) and the episulfide compound represented by formula (2):

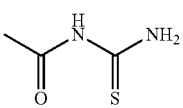

(1)

(2)

(wherein m represents an integer of 0 to 4, and n represents an integer of 0 to 2).

2. The composition for optical material according to claim 1, which comprises the compound represented by formula (2) in an amount of 40% to 99.999% by mass.

3. The composition for optical material according to claim 2, which further comprises a polythiol.

4. The composition for optical material according to claim 3, which further comprises a polyisocyanate.

5. The composition for optical material according to claim 1, which further comprises sulfur.

6. A polymerization-curable composition, which comprises the composition for optical material according to claim 1 and a polymerization catalyst in an amount of 0.0001% by mass to 10% by mass relative to the total mass of the composition for optical material.

7. An optical material obtainable by curing the composition for optical material according to claim 1.

8. An optical lens comprising the optical material according to claim 7.

9. A method for producing an optical material, which comprises polymerization-curing the composition for optical material according to claim 1 by addition of a polymerization catalyst in an amount of 0.0001% to 10% by mass relative to the total mass of the composition for optical material.

10. The method for producing an optical material according to claim 9, wherein the polymerizable compound represented by formula (2) and sulfur are partially subjected to polymerization reaction, followed by polymerization-curing.

11. An optical material obtainable by curing the composition for optical material according to claim 6.

* * * * *